United States Patent
Kim et al.

(10) Patent No.: US 10,802,230 B2
(45) Date of Patent: Oct. 13, 2020

(54) FIBER-BASED MULTI-SOURCE PHOTON COLLECTOR AND SYSTEMS AND METHODS UTILIZING SAME

(71) Applicant: Duke University, Durham, NC (US)

(72) Inventors: Jungsang Kim, Chapel Hill, NC (US); Stephen Crain, Durham, NC (US)

(73) Assignee: Duke University, Durham, NC (US)

( * ) Notice: Subject to any disclaimer, the term of this patent is extended or adjusted under 35 U.S.C. 154(b) by 132 days.

(21) Appl. No.: 16/116,492

(22) Filed: Aug. 29, 2018

(65) Prior Publication Data

US 2019/0064456 A1    Feb. 28, 2019

Related U.S. Application Data

(60) Provisional application No. 62/552,062, filed on Aug. 30, 2017.

(51) Int. Cl.
*G01T 1/04*    (2006.01)
*G02B 6/42*    (2006.01)
*G06N 10/00*   (2019.01)

(52) U.S. Cl.
CPC ......... *G02B 6/4206* (2013.01); *G02B 6/4249* (2013.01); *G06N 10/00* (2019.01)

(58) Field of Classification Search
CPC ..... G02B 6/4206; G02B 6/4249; G06N 10/00
See application file for complete search history.

(56) References Cited

U.S. PATENT DOCUMENTS

| 2007/0201022 | A1* | 8/2007 | Neiss | G01J 3/0218 356/300 |
| 2014/0339445 | A1* | 11/2014 | Sharpe | G01N 15/1459 250/574 |
| 2016/0054176 | A1* | 2/2016 | Gu | G01J 1/0437 356/121 |

OTHER PUBLICATIONS

Barredo et al., "an atom-by-atom assembler of detect-freee arbitrary two-dimensional atomic arrays," 2016, Science, vol. 354, Issue 6315, pp. 1021-1-23 (Year: 2016).*
VanDevender et al., "Efficient fiber optic detection of trapped ion fluorescence", 2010 Physics Review Letters, vol. 105, No. 023001 pp. 023001-1 to 023001-4 (Year: 2010).*
Ghadimi et al., "Scalable ion-photon quantum interface based on integrated diffractive mirrors," 2017, Quantum Information, 4 pages. (Year: 2017).*
Rachel Noek et al., "High speed, high fidelity detection of an atomic hyperfine qubit", "Optics Letters", published Nov. 15, 2013, vol. 38, No. 22, http://dx.doi.org/10.1364/OL.38.004735, publisher: Optical Society of America.

* cited by examiner

*Primary Examiner* — Kiho Kim
(74) *Attorney, Agent, or Firm* — Kaplan Breyer Schwarz, LLP

(57) ABSTRACT

A system for the collection and isolation of photons from multiple photon sources is provided that images individual photon sources onto individual optical fibers. The collected photons can then be directed to one or more photon detectors. The present invention is particularly applicable to a qubit state detection system for the detection of individual qubit states.

32 Claims, 5 Drawing Sheets

FIBER-BASED MULTI-SOURCE PHOTON COLLECTOR AND SYSTEMS AND METHODS UTILIZING SAME

STATEMENT OF RELATED CASES

This application claims priority to U.S. Provisional Application Ser. No. 62/552,062, filed Aug. 30, 2017, whose entire disclosure is incorporated herein by reference.

GOVERNMENT RIGHTS

This invention was made with government support under Federal Grant No. W911NF-16-1-0082 awarded by the Army Research Office. The government has certain rights in this invention.

FIELD OF THE INVENTION

The present invention relates to photon collectors in general, and, more particularly, to a fiber-based photon collector capable of collecting and isolating photons from multiple photon sources.

BACKGROUND OF THE INVENTION

The Background of the Invention and the Detailed Description of Preferred Embodiments below cite numerous technical references, which are listed in the Appendix below. The numbers shown in brackets ("[ ]") refer to specific references listed in the Appendix. For example, "[1-3]" refers to references [1], [2] and [3] in the Appendix below. All of the references listed in the Appendix below are incorporated by reference herein in their entirety.

Trapped atoms or ions have been shown to be a functional and scalable solution for the physical realization of a qubit for quantum information [1-3]. To scale to large numbers of qubits, the ions can be spatially separated to allow for multiplexing of operations [4]. Certain quantum circuits, such as quantum error correction, require that ancilla qubits be measured in the middle of the algorithm [5, 6]. It is critical to preserve the memory of the data qubits while this resonant, destructive detection process is performed. By leveraging the segmented control electrodes of microfabricated surface traps [7, 8], multiple trapping zones and shuttling paths can be used to spatially separate the qubits needed for state detection. The ability to accurately and quickly measure the state of the qubit is critical for high fidelity algorithms as well as quantum error correction [9-11].

For the $^{171}Yb^+$ qubit, the state readout is performed by state dependent florescence using a cycling transition between one of the qubit levels and a higher energy level, as shown in FIG. 1. When the ion is in the |1> state, the resonant 370 nm laser beam pumps the ion to the $^2P_{1/2}$ excited state, where it will spontaneously emit a photon as it transitions back to the three bright states. The detection beam is not resonant with any transitions for an ion in the |0> state, so the ion will not scatter any photons from that state.

The measurement time and fidelity is driven by the collection and detection efficiency of the scattered photons. For a chain of trapped ions (qubits), the scattered photons from each ion must be separately detected in order to determine the state of each qubit. Thus, there is a need for a photon collection and detection system that is efficient and that is capable of isolating and detecting photons from each of the individual trapped ions in an ion chain with little or no crosstalk between photons from respective ions.

SUMMARY OF THE INVENTION

An object of the invention is to solve at least the above problems and/or disadvantages and to provide at least the advantages described hereinafter.

The present invention provides a system for the collection and isolation of photons from multiple photon sources in which individual photon sources are imaged onto individual optical fibers. The collected photons can then be directed to one or more photon detectors. The present invention enables the use of separate respective photon detectors for detecting photons emitted from respective photon sources (e.g., respective ions) with no optical or electrical crosstalk. The present invention is particularly applicable to a state detection system for the detection of individual qubit states. However, it should be appreciated that the present invention is applicable to any system in which it is desirable to collect and segregate photons from multiple photon sources.

An embodiment of the invention is a system for collecting photons from at least two photon sources, comprising: an imaging system in optical communication with the at least two photon sources; and an optical fiber array in optical communication with the imaging system, wherein the optical fiber array comprises at least a respective optical fiber for each photon source; wherein a numerical aperture of the imaging system and the imaging system's position relative to the at least two photon sources and the optical fiber array are adapted so as to image at least some of the photon sources onto a respective optical fiber in the optical fiber array.

Another embodiment of the invention is a qubit state detection system, comprising: a vacuum chamber; a linear chain of at least two trapped atoms or ions in the vacuum chamber; an imaging system in optical communication with the at least two trapped atoms or ions; an optical fiber array in optical communication with the imaging system, wherein the optical fiber array comprises at least a respective optical fiber for each trapped atom or ion; wherein a numerical aperture of the imaging system and the imaging system's position relative to the at least two trapped ions and the optical fiber array are adapted so as to image at least some of the trapped atoms or ions onto a respective optical fiber in the optical fiber array; and a respective photon detector for each optical fiber in the optical fiber array, wherein each photon detector is in optical communication with a respective optical fiber for detecting photons scattered by a respective trapped atom or ion.

Another embodiment of the invention is a qubit state detection method, comprising: collecting photons from each of at least two linearly arranged trapped atoms or ions; coupling photons from at least some of the at least two trapped atoms or ions into respective optical fibers; and detecting photons that exit each of the respective optical fibers with at least one photon detector.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In the following detailed description of various embodiments of the system and method of the present invention, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of embodiments.

Articles "a" and "an" are used herein to refer to one or to more than one (i.e. at least one) of the grammatical object of the article. By way of example, "an element" means at least one element and can include more than one element. Unless otherwise defined, all technical terms used herein have the same meaning as commonly understood by one of ordinary skill in the art to which this disclosure belongs.

While preferred embodiments are disclosed, still other embodiments of the system and method of the present invention will become apparent to those skilled in the art from the following detailed description, which shows and describes illustrative embodiments. As will be realized, the following disclosure is capable of modifications in various obvious aspects, all without departing from the spirit and scope of the present invention. Also, the reference or non-reference to a particular embodiment of the invention shall not be interpreted to limit the scope of the present invention.

Figure 1:
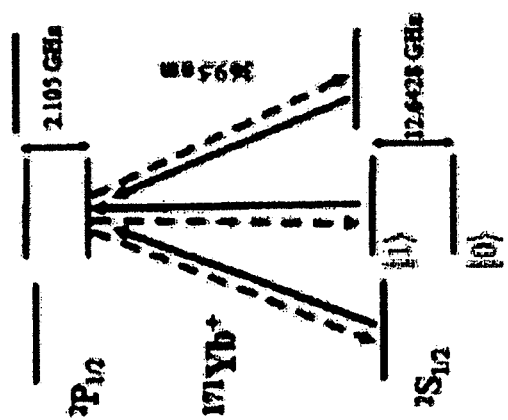
FIG. 1 is a schematic diagram of the relevant energy levels of the $^{171}Yb^+$ qubit.
Figure 2:
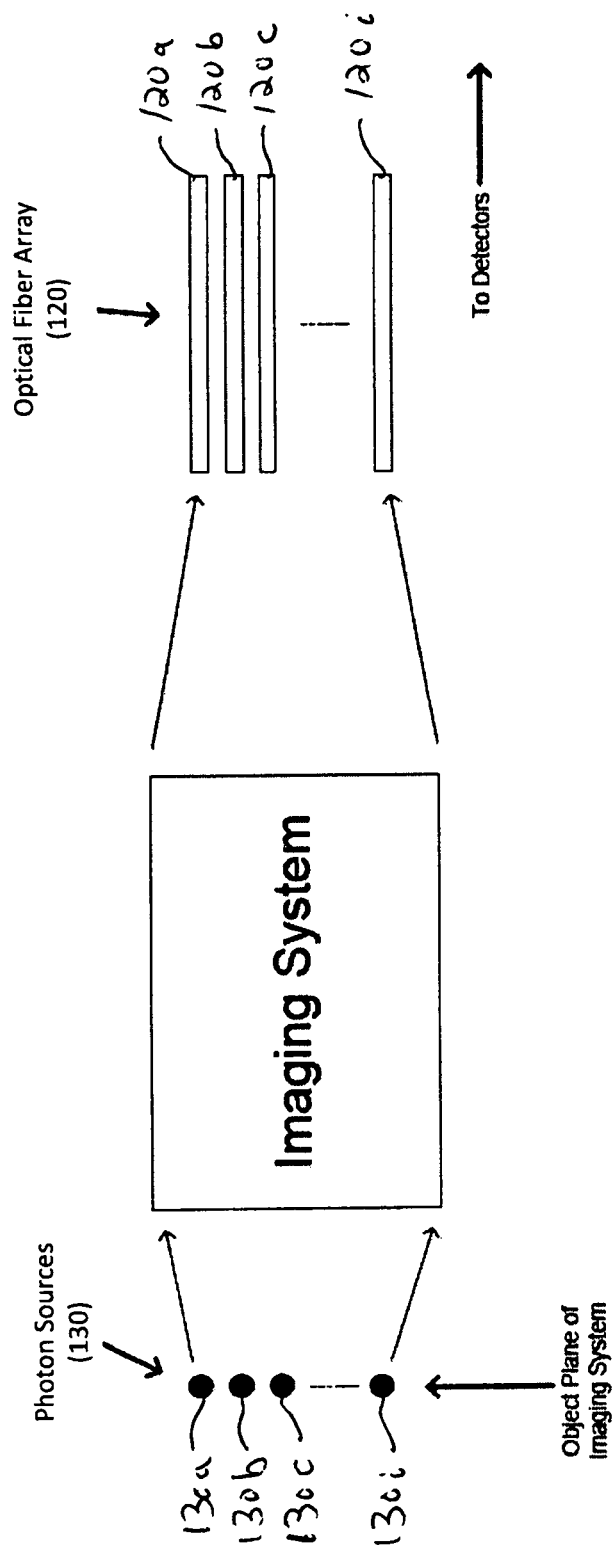
FIG. 2 is a schematic diagram of a system for collecting photons from at least two linearly arranged photon sources, in accordance with an illustrative embodiment of the present invention.

FIG. 2 is a schematic diagram of a system for collecting photons from at least two photon sources (collectively 130), in accordance with an illustrative embodiment of the present invention. The system 100 includes imaging system 110 and optical fiber array 120. The imaging system 100 is adapted to image individual photon sources 130a-130i onto respective individual optical fibers 120a-120i that make up the optical fiber array 120. Thus, individual photon sources 130a-130i are mapped to respective individual optical fibers 120a-120i. In the illustrative embodiment of FIG. 2, photons originating from photon source 130a are imaged onto (i.e., coupled into) optical fiber 120a, photons originating from photon source 130b are imaged onto (i.e., coupled into) optical fiber 120b, etc.

In this manner, photons emanating from individual photon sources 130a-130i are collected and segregated by the imaging system 110 and individual optical fibers 120a-120i. The photons output by optical fibers 120a-120i can then be directed to one or more detectors (not shown in FIG. 2).

This architecture eliminates optical crosstalk between neighboring photon sources 130a-130i. For example, photons originating from photon source 130a will only be coupled into optical fiber 120a, photons originating from photon source 130b will only be coupled into optical fiber 120b, etc.

As discussed above, the imaging system 100 is adapted to image individual photon sources 130a-130i onto respective individual optical fibers 120a-120i that make up the optical fiber array 120. The numerical aperture ("N.A.") of the imaging system 100 determines the photon collection efficiency of the imaging system 100. A higher N.A. will result in a higher photon collection efficiency. However, the higher the N.A., the more difficult it is to control aberrations and align the imaging system 100 such that photons from each of the photon sources 130a-130i will be coupled into its respective optical fiber 120a-120i. Thus, the N.A. should be chosen as to provide an acceptable compromise between collection efficiency and alignment tolerances.

In the embodiment illustrated in FIG. 2, the photon sources 130 are linearly arranged, as are the individual optical fibers 120a-120i that make up the optical fiber array 120. However, it should be appreciated that the individual photon sources 130a-130i and associated optical fibers 120a-120i could also be arranged in a two-dimensional array.

In one illustrative example, the photon sources 130 are preferably $^{171}Yb^+$ ions with 5 μm spacing between them. The optical fiber array 120 is made up of multi-mode optical fibers with a core diameter of 50 μm and a pitch (spacing) of 250 μm. In this illustrative embodiment, the imaging system preferably has a N.A. of 0.3-0.6, and a magnification of 50 so as to map each photon source 130 to a respective optical fiber 120. A N.A. of 0.3 will result in a collection efficiency of approximately 2%, whereas a N.A. of 0.6 will result in a collection efficiency of approximately 10%.

Generally, however, the photon sources 130 can be any type of photon source, such as other types of ions or a non-ionized neutral atom (hereinafter referred to as an "atom" or "atoms"). If ions or atoms are used as the photon sources 130, the spacing between them is preferably in the range of 0.5 μm to 10 μm, and the optical fiber array 120 is made up of multi-mode optical fibers preferably with a core diameter in the range of 10 μm to 1,000 μm and a fiber pitch preferably in the range of 125 μm to 1 mm. Further, the imaging system preferably has a N.A. of at least 0.1.

Figure 3:
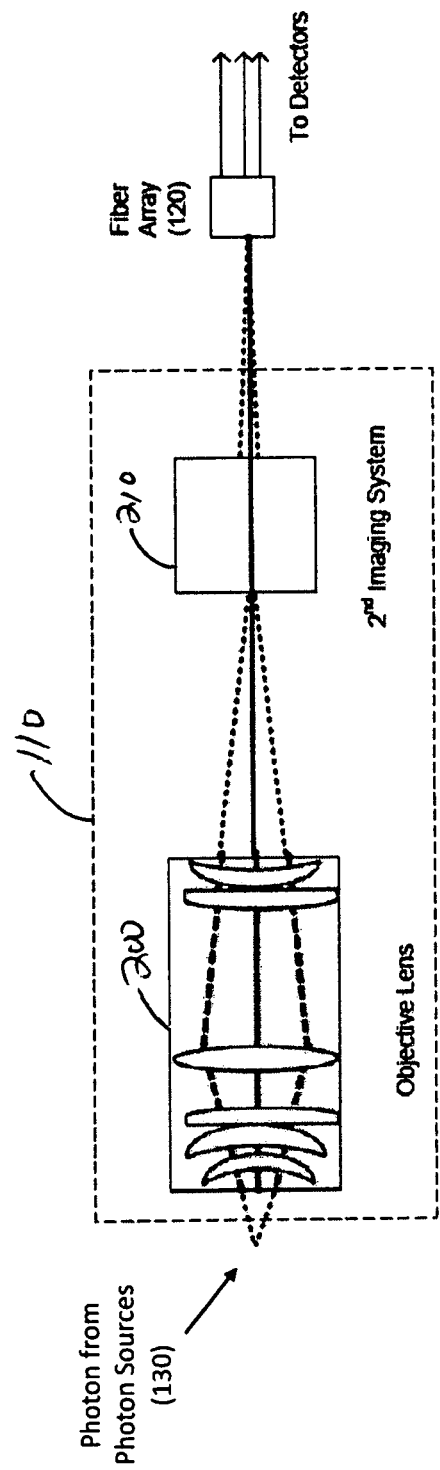
FIG. 3 is a schematic diagram of one illustrative embodiment of an imaging system that includes an objective lens and a second imaging system, in accordance with an illustrative embodiment of the present invention.

Imaging system 100 can include any number of optical elements/systems in order to obtain the required N.A. and magnification to map the individual photon sources 130 to respective optical fibers 120. FIG. 3 is a schematic diagram of one illustrative embodiment of an imaging system 110 that includes an objective lens 200 and a second imaging system 210.

In the illustrative example in which the photon sources 130 are $^{171}Yb^+$ ions with 5 μm spacing between them, and the optical fiber array 120 is made up of multi-mode optical fibers with a core diameter of 50 μm and a pitch (spacing) of 250 μm, the objective lens 200 preferably has a NA of 0.6, and the $2^{nd}$ imaging system 210 is preferably a single plano-convex lens with a focal length of 500 mm. In this illustrative example, the distance between the objective lens 200 and the photon $^{171}Yb^+$ ions is preferably 17 mm.

Figure 4:
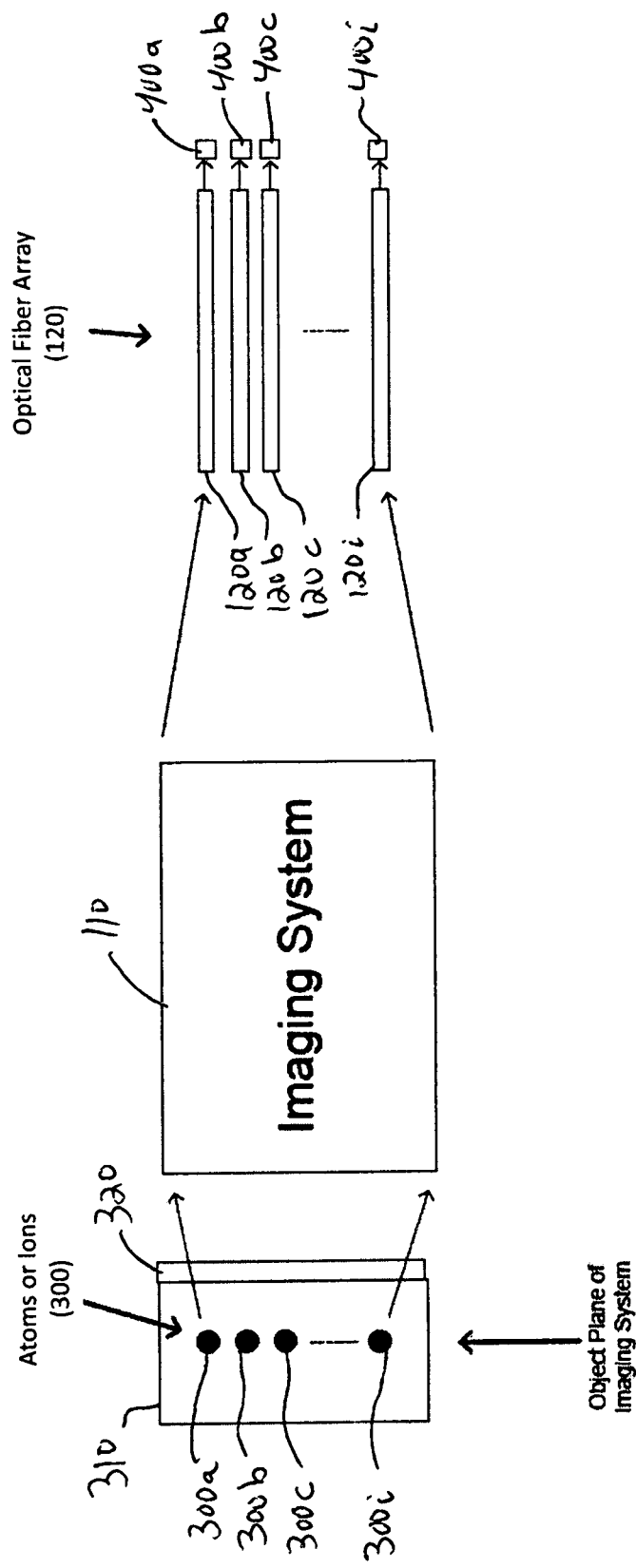
FIG. 4 is a schematic diagram of a qubit state detection system, in accordance with an illustrative embodiment of the present invention.

As discussed above, the present invention can be used to implement a qubit state detection system, as shown in FIG. 4. In the illustrative embodiment of FIG. 4, the qubits are implemented with ions or atoms 300a-300i, suitably $^{171}Yb^+$ ions. In the embodiment illustrated in FIG. 4, the ions or atoms 300a-300i are trapped inside a vacuum chamber 310 so as to form a linear chain of ions or atoms that are spaced apart, preferably with a spacing of between 0.5 μm to 10 μm.

However, as discussed above, the ions or atoms 300a-300i could also be arranged in a two-dimensional array. The vacuum chamber 310 includes a window 320 that allows the scattered photons to pass through to the imaging system 110.

At least some of the ions or atoms 300a-300i are imaged onto respective optical fibers 120a-120i. In a preferred embodiment, the output of each optical fiber 120a-120i is detected by separate respective photon detectors 400a-400i. In this configuration, there is no electrical crosstalk due to photons from different ions or atoms being detected by a common photon detector. However, it should be appreciated that any number of photon detectors can be used while still falling within the scope of the present invention. For example, a multi-channel photomultiplier tube (PMT) could be used as a common photon detector for all of the optical fiber outputs.

The photon detector or detectors 400a-400i can be any type of photon detector known in the art. For example, the photon detector(s) can be implemented with a PMT, a charge-coupled device, an avalanche photodiode or a superconducting nanowire single photon detector [13-14].

Figure 5:
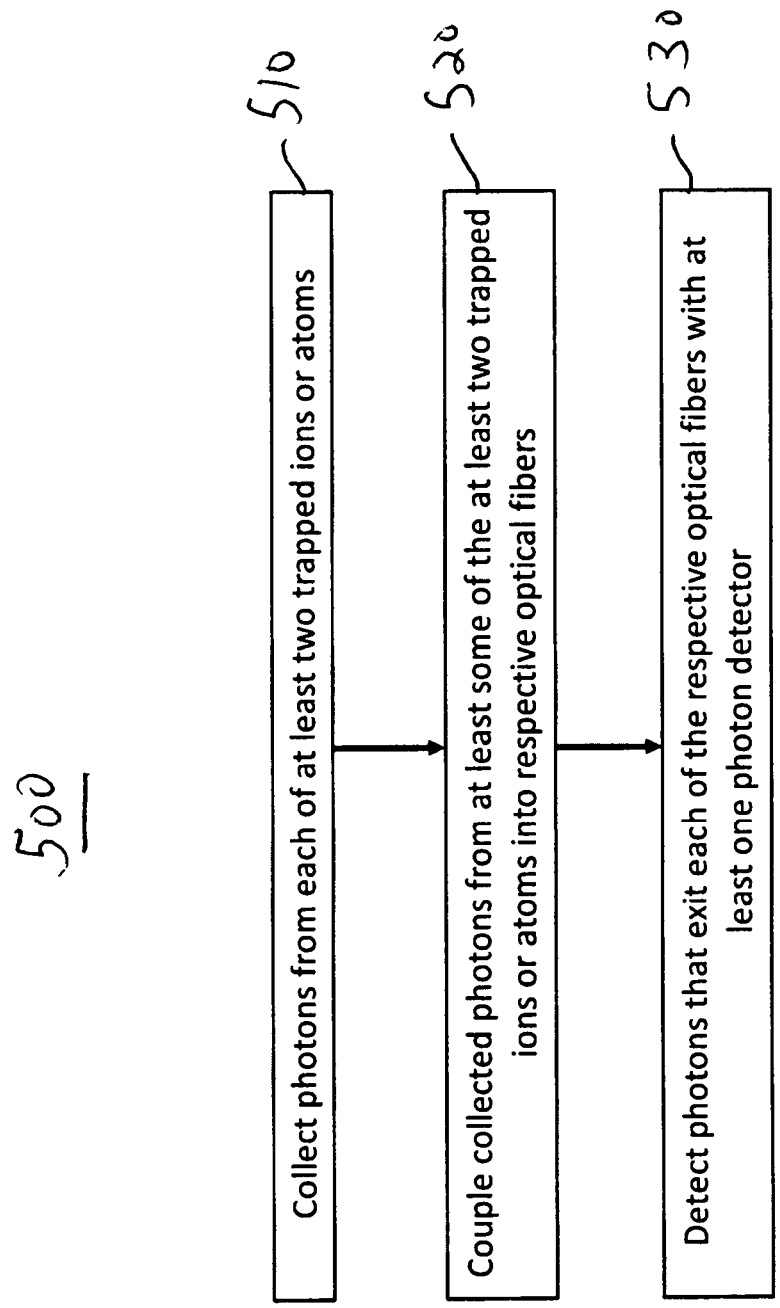
FIG. 5 is a flowchart of a qubit state detection method, in accordance with an illustrative embodiment of the present invention.

FIG. 5 is a flowchart of a qubit state detection method, in accordance with an illustrative embodiment of the present invention. The method 500 begins with step 510, where photons are collected from each of at least two trapped ions or atoms. Then, at step 520, the collected photons from at least some of the at least two trapped ions or atoms are coupled into respective optical fibers. Then, at step 530, the photons that exit each of the respective optical fibers are detected with at least on photon detector.

The foregoing embodiments and advantages are merely exemplary, and are not to be construed as limiting the present invention. The description of the present invention is intended to be illustrative, and not to limit the scope of the claims. Many alternatives, modifications, and variations will be apparent to those skilled in the art. Various changes may be made without departing from the spirit and scope of the invention.

Appendix

[1] D. J. Wineland, C. Monroe, W. M. Itano, D. Leibfried, B. E. King, and D. M. Meekhof, Journal of Research of the National Institute of Standards and Technology 103, 259 (1998).
[2] J. Kim and C. Monroe, Science 339, 1164 (2013).
[3] E. Knill, Nature 434 (2005), 10.1038/nature03350.
[4] D. Kielpinski, C. Monroe, and D. J. Wineland, Nature 417, 709 (2002).
[5] A. M. Steane, Quantum Information & Computation 7, 171 (2007).
[6] Y. Tomita and K. M. Svore, Phys. Rev. A 90, 062320 (2014).
[7] S. C. Doret, J. M. Amini, K. Wright, C. Volin, T. Killian, A. Ozakin, D. Denison, H. Hayden, C.-S. Pai, R. E. Slusher, and A. W. Harter, New Journal of Physics 14, 073012 (2012).
[8] J. M. Amini, H. Uys, J. H. Wesenberg, S. Seidelin, J. Britton, J. J. Bollinger, D. Leibfried, C. Ospelkaus, A. P. VanDevender, and D. J. Wineland, New Journal of Physics 12, 033031 (2010).
[9] A. H. Myerson, D. J. Szwer, S. C. Webster, D. T. C. Allcock, M. J. Curtis, G. Imreh, J. A. Sherman, D. N. Stacey, A. M. Steane, and D. M. Lucas, Physical Review Letters 100, 4 (2008).
[10] K. Brown, J. Kim, and C. Monroe, Npj Quantum Information 2 (2016), 10.1038/npjqi.2016.34.
[11] D. P. DiVincenzo and P. Aliferis, Phys. Rev. Lett. 98, 020501 (2007).
[12] S. Olmschenk, K. C. Younge, D. L. Moehring, D. N. Matsukevich, P. Maunz, and C. Monroe, Physical Review A76 (2007).
[13] E. A. Dauler, M. E. Grein, A. J. Kerman, F. Marsili, S. Miki, S. W. Nam, M. D. Shaw, H. Terai, V. B. Verma, and T. Yamashita, Opt. Eng. 53, 081907 (2014).
[14] C. Cahall, K. L. Nicolich, N. T. Islam, G. P. Lafyatis, A. J. Miller, D. J. Gauthier, and J. Kim, Optica 4, 1534 (2017).

What is claimed is:

1. A system for collecting photons from a plurality of photon sources, comprising:
    an imaging system in optical communication with the plurality of photon sources, wherein the imaging system includes an objective lens; and
    an optical fiber array in optical communication with the imaging system, wherein the optical fiber array comprises at least a respective optical fiber for each photon source of the plurality thereof;
    wherein a numerical aperture of the imaging system and the imaging system's position relative to the plurality of photon sources and the optical fiber array are adapted such that:
    the objective lens collects photons from the plurality of photon sources; and
    the imaging system images each photon source of the plurality thereof onto a different optical fiber of the optical fiber array.

2. The system of claim 1, wherein the objective lens has a numerical aperture of at least 0.1.

3. The system of claim 2, wherein the plurality of photon sources comprise at least two trapped atoms or ions that are spaced between 0.5 μm and 10 μm apart, and wherein the optical fiber array has a fiber pitch between 125 μm and 1 mm.

4. The system of claim 1, wherein the plurality of photon sources comprise between 10 and 1,000 trapped atoms or ions spaced between 0.5 μm and 10 μm apart, and wherein the optical fiber array comprises at least a respective optical fiber for each photon source with a fiber pitch between 125 μm and 1 mm, wherein at least some photons scattered from at least some of the trapped atoms or ions are directed onto a respective optical fiber in the optical fiber array by the imaging system.

5. The system of claim 4, wherein the imaging system further comprises a second imaging system in optical communication with the objective lens.

6. The system of claim 5, wherein the objective lens has a numerical aperture of at least 0.1.

7. The system of claim 6, wherein the second imaging system comprises a planoconvex lens.

8. The system of claim 4, wherein each optical fiber has a core diameter of between 10 μm and 1,000 μm.

9. The system of claim 1, further comprising a respective photon detector for each optical fiber in the optical fiber array, wherein each photon detector is in optical communication with a respective optical fiber for detecting photons scattered by a respective photon source.

10. The system of claim 9, wherein each respective photon detector comprises a photomultiplier tube, an avalanche photodiode or a superconducting nanowire single photon detector.

11. The system of claim 1, wherein the plurality of photon sources are linearly arranged.

12. The system of claim 1, wherein the plurality of photon sources comprise at least three photon sources arranged in a two-dimensional array.

13. A qubit state detection system, comprising:
- a vacuum chamber;
- a plurality of trapped atoms or ions in the vacuum chamber;
- an imaging system in optical communication with the plurality of trapped atoms or ions, wherein the imaging system includes an objective lens;
- an optical fiber array in optical communication with the imaging system, wherein the optical fiber array comprises at least a respective optical fiber for each trapped atom or ion; and
- a respective photon detector for each optical fiber in the optical fiber array, wherein each photon detector is in optical communication with a respective optical fiber for detecting photons scattered by a respective trapped atom or ion;
- wherein a numerical aperture of the imaging system and the imaging system's position relative to the plurality of trapped atoms or ions and the optical fiber array are adapted such that:
  - the objective lens collects photons from the plurality of trapped atoms or ions; and
  - the imaging system images each trapped atom or atom or ion onto a respective optical fiber in the optical fiber array.

14. The system of claim 13, wherein the objective lens has a numerical aperture of at least 0.1.

15. The system of claim 13, wherein the plurality of trapped atoms or ions are spaced between 0.5 μm and 10 μm apart, and wherein the optical fiber array has a fiber pitch between 125 μm and 1 mm.

16. The system of claim 13, wherein the plurality of trapped atoms or ions comprises between 10 and 1,000 trapped atoms or ions spaced between 0.5 μm and 10 μm apart, and wherein the optical fiber array comprises at least a respective optical fiber for each photon source with a fiber pitch between 125 μm and 1 mm, wherein at least some photons scattered from at least some of the trapped atoms or ions are directed onto a respective optical fiber in the optical fiber array by the imaging system.

17. The system of claim 16, wherein the imaging system further comprises a second imaging system in optical communication with the objective lens.

18. The system of claim 17, wherein the objective lens has a numerical aperture of at least 0.1.

19. The system of claim 17, wherein the second imaging system comprises a plano-convex lens.

20. The system of claim 16, wherein each optical fiber has a core diameter of between 10 μm and 1,000 μm.

21. The system of claim 13, wherein the plurality of trapped atoms or ions comprises at least two $^{171}$Yb$^+$ ions.

22. The system of claim 13, wherein each respective photon detector comprises a photomultiplier tube, an avalanche photodiode or a superconducting nanowire single photon detector.

23. The system of claim 13, wherein the plurality of trapped atoms or ions is linearly arranged.

24. The system of claim 13, wherein the plurality of trapped atoms or ions comprises at least three trapped atoms or ions arranged in a two-dimensional array.

25. A qubit state detection method, comprising:
- collecting photons from a plurality of trapped atoms or ions via an objective lens;
- coupling at least some of the collected photons into respective optical fibers; and
- detecting photons that exit each of the respective optical fibers with at least one photon detector.

26. The method of claim 25, wherein the at least some of the collected photons are collected and coupled into the respective optical fibers via a first imaging system that includes the objective lens.

27. The method of claim 26, wherein the first imaging system further comprises a second imaging system in optical communication with the objective lens.

28. The method of claim 25, wherein the trapped atoms or ions of the plurality thereof are spaced between 0.5 μm and 10 μm apart and wherein the respective optical fibers are spaced between 125 μm and 1 mm apart.

29. The method of claim 25, wherein the at least one photon detector comprises a respective photon detector for each optical fiber.

30. The method of claim 29, wherein each respective photon detector comprises a photomultiplier tube, an avalanche photodiode or a superconducting nanowire single photon detector.

31. The method of claim 25, wherein the plurality of trapped atoms or ions are linearly arranged.

32. The system of claim 25, wherein the plurality of trapped atoms or ions comprises at least three trapped atoms or ions arranged in a two-dimensional array.

* * * * *